United States Patent [19]

Haitko

[11] Patent Number: 4,471,068

[45] Date of Patent: Sep. 11, 1984

[54] PROCESS AND CATALYST FOR PREPARATION OF POLYPHENYLENE OXIDE

[75] Inventor: Deborah A. Haitko, Schenectady, N.Y.

[73] Assignee: General Electric Company, Schenectady, N.Y.

[21] Appl. No.: 474,604

[22] Filed: Mar. 11, 1983

[51] Int. Cl.³ .................... B01J 27/24; B01J 23/72
[52] U.S. Cl. .................................... 502/165; 528/212
[58] Field of Search ..................... 502/165; 528/212

[56] References Cited

U.S. PATENT DOCUMENTS

| | | | |
|---|---|---|---|
| 3,306,874 | 2/1967 | Hay | 528/212 X |
| 3,306,875 | 2/1967 | Hay | 528/212 X |
| 3,661,848 | 5/1972 | Cooper et al. | 528/212 X |
| 3,733,299 | 5/1973 | Cooper et al. | 528/212 X |
| 3,914,266 | 10/1975 | Hay | 528/212 X |
| 4,028,341 | 6/1977 | Hay | 528/212 X |

Primary Examiner—Patrick Garvin
Attorney, Agent, or Firm—William H. Pittman; James C. Davis, Jr.; James Magee, Jr.

[57] ABSTRACT

Polyphenylene oxides are prepared by the oxidative coupling of monohydroxy aromatic compounds such as 2,6-xylenol in the presence of copper-bromide-amine catalysts in which at least part of the amine component is a diamine such as N,N'diphenylethylendiamine, N,N'-diphenyl-N,N'-dimethylethylene diamine or N,N'-diphenylpiperazine. Other amines preferably present in the catalyst are a tertiary monoamine such as dimethyl-n-butylamine and a secondary monoamine such as di-n-butylamine. The diamines are characterized by a low rate of consumption during polymerization, and the catalysts prepared therefrom are hydrolytically stable.

9 Claims, No Drawings

PROCESS AND CATALYST FOR PREPARATION OF POLYPHENYLENE OXIDE

This invention relates to the preparation of polyphenylene oxides by the oxidative coupling of monohydroxy aromatic compounds, and to catalysts useful in such preparation. In its broadest sense, the invention in one of its aspects is directed to oxidative coupling catalysts comprising compositions prepared by blending a source of copper ions, a source of bromide ions and an amine component, at least part of said amine component being at least one diamine having the formula

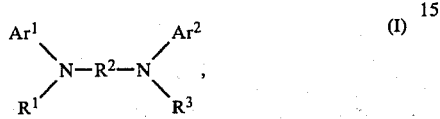
(I)

wherein each of $Ar^1$ and $Ar^2$ is an aromatic radical containing about 6-10 carbon atoms; each of $R^1$ and $R^3$ is hydrogen or a saturated aliphatic radical containing 2-4 carbon atoms; and $R^2$ is a divalent saturated aliphatic or alicyclic radical containing 2-7 carbon atoms.

The preparation of polyphenylene oxides by the oxidative coupling of monohydroxy aromatic compounds is well known in the art. Among the patents disclosing polyphenylene oxides and methods for their preparation are the following, the disclosures of all of which are incorporated by reference herein:

3,306,864 (hereinafter '874)
3,306,875 (hereinafter '875)
3,384,619
3,432,466
3,639,656
3,642,699
3,661,848
3,733,299
3,914,266 (hereinafter '266)
4,028,341 (hereinafter '341)

At present, the preferred catalysts for the preparation of polyphenylene oxides from monohydroxy aromatic compounds are copper-bromide-amine catalysts. These are typically made by blending (often in solution in the monohydroxyaromatic compound) a source of copper ions, a source of bromide ions and an amine component. The amine component comprises at least one amine and usually a plurality of amines of different chemical structures. Especially preferred are mixtures of at least one tertiary monoamine, at least one secondary monoamine and at least one diamine.

As disclosed in the '341 patent, the diamines which are preferred for use in the catalyst are those having a $C_{2-4}$ alkylene or $C_{3-7}$ cycloalkylene and preferably an ethylene group connecting the two nitrogens, and having a bulky alkyl group additionally attached to each nitrogen. The preferred diamine disclosed therein is N,N'-di-t-butylethylenediamine. It has now been found, however, that this diamine is often consumed quite rapidly in the polymerization and must frequently be replenished in order to complete the polymerization.

A principal object of the present invention, therefore, is to provide an improved catalyst system for the production of polyphenylene oxides.

A further object is to provide a process for producing polyphenylene oxides using an improved catalyst, the improvement therein being attributable to the identiy of the diamine constituent.

A still further object is to provide a catalyst system and polymerization method which are characterized by decreased consumption of the diamine constituent during polymerization.

Other objects will in part be obvious and will in part appear hereinafter.

Typical monohydroxy aromatic compounds (hereinafter sometimes referred to as "phenols" for brevity) useful for the preparation of polyphenylene oxides according to this invention are those having the formula

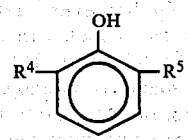

wherein $R^4$ is a lower primary alkyl group and $R^5$ is a lower primary or secondary alkyl group, the word "lower" meaning that it contains up to 7 carbon atoms. Examples of lower primary alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of lower secondary alkyl groups are isopropyl, sec-butyl and 1-ethylpropyl. Preferably, $R^4$ and $R^5$ are straight chain rather than branched. Since the polyphenylene oxides in which $R^4$ and $R^5$ are other than methyl generally have no more desirable properties than those in which they are both methyl, and since 2,6-xylenol is the most readily available and cheapest, 2,6-dialkylphenol, its use is preferred. The polyphenylene oxide obtained is then poly(2,6-dimethyl-1,4-phenylene oxide). Other suitable phenols are disclosed in the '874, '875 and '341 patents.

Various copper-bromide-amine catalysts containing monoamines have been disclosed for the preparation of polyphenylene oxides, and any of such catalysts and/or monoamines can be used in accordance with this invention. The source of copper ion therein can be any of the cupric or cuprous compounds disclosed in the '874 and '875 patents (for example, '874 from column 3 line 62, to column 4, line 61); it is preferably cuprous oxide ($Cu_2O$).

The source of bromide ion can be any of those disclosed in the '341 patent; particular reference is made to column 8, line 61, to column 9, line 53. For example, it can be an inorganic bromide (except for ammonium bromide, because the ammonium ion can also form a strong complex with copper ions) and can include bromine and hydrogen bromide. Also useful are organic bromine compounds which, under reaction conditions, produce bromide ions. An example thereof is 4-bromo-2,6-xylenol. The only basic requirement is that the bromine compound be capable of supplying a form of bromide ion which is soluble in the reaction mixture. If the bromine compound itself is insoluble, it can still be satisfactory if it forms soluble complexes with the amine component or produces a soluble product under oxidative coupling conditions. When metal bromides other than the copper bromides are used, the particular metal used is merely one of choice. Since some of these materials (e.g., cobalt) form complexes with amines, suitable adjustments in the amount of amine used may sometimes be necessary. Because of low cost and ready availability, when using a metal bromide often the alkali or alkaline earth metal bromides are used, e.g., sodium bromide. Since hydrogen bromide will react with amines to form an amine hydrobromide salt and bromide will brominate the phenol and simultaneously produce hydrogen bromide, again adjustments in the amount of amine may be necessary in such situations.

The currently preferred bromine source is HBr, which may conveniently be combined with the copper source as a solution of cuprous oxide in aqueous hydrobromic acid.

The monoamine constituents of the catalyst mixture may be any of those disclosed in the '874, '875, '266 and '341 patents. Preferably, however, they include at least one tertiary monoamine, which can be selected from those disclosed in the '875 and '341 patents; specific reference should be made to columns 3–5 of '875 and column 8, lines 24–33, of 341. The tertiary monoamine can be heterocyclic or a trialkylamine characterized by having the amine nitrogen attached to at least two groups which have a small cross-sectional area. In the case of a trialkylamine, it is preferred that at least two of the alkyl groups be methyl with the third being a $C_{1-8}$ primary or $C_{3-8}$ secondary alkyl, and it is more preferred that the third substituent have no more than four carbon atoms. Illustrative tertiary monoamines are N-methylpyrrolidine and dimethyl-n-butylamine, with the latter being preferred.

At least one secondary monoamine as disclosed in the '874 patent from column 4, line 62, to column 6, line 13, may optionally be used in the catalyst. The presence of such a secondary monoamine appears to have the effects of increasing impact strength of the product polymer and increasing catalyst activity. Illustrative secondary monoamines are dimethylamine, diethylamine, dipropylamine, dibutylamine, diisopropylamine, dibenzylamine, dicyclohexylamine, diethanolamine, ethylmethylamine, methylpropylamine, allylethylamine, methylcyclohexylamine, morpholine, methyl-n-butylamine, ethylisopropylamine, benzylmethylamine, octylbenzylamine, octylchlorobenzylamine, methylcyclohexylamine, methylphenethylamine, benzylethylamine, di(chlorophenethyl)-amine, 1-methylamino-2-phenylpropane and 1-methylamino-4-pentene. Aliphatic amines, especially those in which the aliphatic groups are straight chain hydrocarbon groups, are preferred. The most preferred amine of this type is di-n-butylamine.

The principal novel feature of the present invention is the identity of the diamine constituent of the catalyst, said diamine having formula I. In that formula, each of $Ar^1$ and $Ar^2$ is an aromatic radical containing about 6–10 carbon atoms. It may be an aromatic hydrocarbon radical or may contain substituents, typically electron-donating substituents such as alkyl, hydroxy, alkoxy or alkylthio. In general, not more than about three such substituents will be present on any aromatic radical. Illustrative aromatic radicals are phenyl, naphthyl, tolyl, xylyl, hydroxyphenyl, methoxyphenyl, hydroxynaphthyl and methylthionaphthyl. The aromatic hydrocarbon radicals are preferred, especially the phenyl radical.

Each of $R^1$ and $R^3$ is hydrogen or a saturated lower aliphatic radical, the term "lower" denoting radicals containing up to 7 carbon atoms. These radicals may be hydrocarbon radicals or substituted radicals in which the substituents do not materially alter the hydrocarbon character of the radical. Illustrative substituents are hydroxy, alkoxy, fluoro, alkylthio, ketone and carboxylic acid ester radicals. In general, not more than about two such substituents will be present on each radical.

Also contemplated are compounds of formula I in which $R^1$ and $R^3$ together form a divalent saturated aliphatic radical containing 2–4 carbon atoms. Thus, $R^1$ and $R^3$ may be ethylene, propylene, trimethylene, tetramethylene or the like. In such compounds, the central portion of the molecule is a heterocyclic moiety in which the two nitrogen atoms are the hetero atoms. The preferred compounds of formula I are those in which $R^1$ and $R^3$ are each hydrogen (which is especially preferred) or methyl, or in which they together form an ethylene radical.

$R^2$ is a divalent saturated aliphatic or alicyclic radical containing 2–7 carbon atoms. Illustrative radicals include the divalent aliphatic radicals described above with respect to $R^1$ and $R^3$, and such alicyclic radicals as cyclobutylene, cyclopentylene, cyclohexylene and methylcyclohexylene. $R^2$ is most often an aliphatic radical containing 2–4 carbon atoms and is preferably the ethylene radical.

As will be apparent from the foregoing, a wide variety of secondary, tertiary and mixed secondary-tertiary diamines may be used according to this invention. Illustrative diamines are N,N'-diphenylethylenediamine, N,N'-diphenyl-N,N'-dimethylethylenediamine and N,N'-diphenylpiperazine.

A phase transfer agent may also optionally be used in the reaction system as a reaction rate promoter. Useful phase transfer agents are disclosed in U.S. Pat. No. 3,988,297, hereby incorporated by reference; specific reference is made to column 2, lines 11–26, and column 3, lines 1–23. The currently preferred phase transfer agent is Adogen 464, which is a methyltrialkylammonium chloride wherein the alkyl groups have from 8 to 10 carbon atoms.

One or more solvents may be present in the reaction mixture. Typical solvents are disclosed in the '874, '875 and '341 patents. The function of the solvent is to provide a liquid phase in which both the phenol and catalyst are soluble. It need not act as a solvent for the reaction products. Illustrative solvents are toluene and benzene; other inexpensive and readily available commercial solvents may also be used.

The exact method of preparing the copper-bromide-amine catalyst is not critical, though it is often used in the form of a solution in the phenol, and when so used it may be preferred to add the phenol to the preformed catalyst rather than the reverse. Various optional procedures are described in the '875 patent at column 17, lines 9–19.

According to this invention, the oxidative coupling reaction is conducted merely by passing oxygen into the mixture of phenol, catalyst and solvent (if used) at a temperature up to about 40° C. and typically at a rate of about 0.8–1.2 SCFH, until no more heat is generated or the desired amount of oxygen is absorbed. The amount of oxygen generally used is about 0.5–1 mole per mole of phenol. If desired, the oxygen can be diluted with inert gases or air can be used, but the use of pure oxygen is preferred. Sub- or superatmospheric pressures can be used but are seldom if ever necessary.

The invention may be used in both batch and continuous processes. When a batch process is used, the time required is normally about 2–4 hours.

The ratios of reactants and catalyst ingredients used in the oxidative coupling process are somewhat important, but no single ratio is considered critical. The phenol is generally used in an amount of about 5-60%, preferably 10-40% and most preferably 15-25%, of total solution weight. Products which have a commercially desirable molecular weight are most easily obtained in the area of 25% phenol.

The activity of the catalysts of this invention is such that they can be used in relatively low concentration. Copper ratios, for example, are generally 1 mole of copper to about 100-1500 and preferably 250-1000 moles of phenol. The molar ratio of bromide to copper ions in the catalyst affects catalyst activity and a ratio of at least about 3.5 moles Br to 1 mole Cu is preferred. The upper limit of the Br:Cu ratio is not critical and molar ratios as high as 6 or 12 or more can be used. Currently preferred molar ratios are 5-6 moles Br per mole Cu.

The diamine is generally used in an amount of about 0.4-3 moles per mole of copper, and the tertiary monoamine in an amount of about 10-100 moles and preferably 20-60 moles per mole of copper. The secondary monoamine, when present, is generally used in the amount of about 0.5-3 mole percent based on phenol, with 0.5-2 mole percent being preferred. In this regard, dibutylamine appears to be superior to dimethylamine, which may be decrease catalyst activity. The phase transfer agent, when present, is typically used in the amount of about 0.1-0.8%, preferably 0.1-0.2%, by weight based on the phenol.

The polyphenylene oxides produced in accordance with this invention typically have a weight average molecular weight of about 5,000-75,000, corresponding to an intrinsic viscosity of about 0.01-0.75 dl./g. as determined in chloroform at 25° C. The molecular weight is preferably above about 50,000. The product polymer may be isolated from solution by conventional methods such as precipitation by addition of a non-solvent for the polymer.

The diamines used in the catalysts of this invention are characterized by a low rate of consumption during polymerization, as compared with the diamines previously used. In addition, the catalysts of this invention are hydrolytically stable so that it is unnecessary to remove water formed in the reaction.

The process of this invention is illustrated by the following examples.

EXAMPLE 1

A mixture of 40 grams of 2,6-xylenol, 1.96 ml. of dimethyl-n-butylamine, 0.52 ml. of di-n-butylamine, 0.02 gm. of Adogen 464 and 0.1546 gm. of N,N'-diphenylethylenediamine was diluted with toluene to 200 ml. and transferred to a tube equipped with a vibromixer, an oxygen inlet and a thermometer. Oxygen was passed through the mixture for 1 minute, and then 0.224 ml. of a solution of 2.36 grams of cuprous oxide in 20 ml. of 48% aqueous hydrogen bromide was added. Oxygen passage was continued at 0.84 mole per hour for 2¼ hours at 40° C. The polyphenylene oxide polymer was isolated by precipitation with methanol. It had an intrinsic viscosity of 0.43 g./dl., corresponding to a weight average molecular weight of 52,800.

EXAMPLE 2

The procedure of Example 1 was repeated, substituting N,N'-diphenylpiperazine on an equimolar basis for the N,N'-diphenylethylenediamine. The polymerization time was about 2½ hours. The product had an intrinsic viscosity of 0.38 g./dl., corresponding to a weight average molecular weight of 49,100.

EXAMPLE 3

The procedure of Example 1 was repeated, substituting N,N'-diphenyl-N,N'-dimethylethylenediamine on an equimolar basis for the N,N'-diphenylethylenediamine and using 0.448 ml. of the Cu₂O/HBr solution. The polymerization time was about 1½ hours. The product had an intrinsic viscosity of 0.43 g./dl., corresponding to a weight average molecular weight of 50,200.

What is claimed is:

1. A catalyst comprising a composition prepared by blending a source of copper ions, a source of bromide ions other than ammonium bromide, and an amine component, at least part of said amine component being at least one diamine having the formula

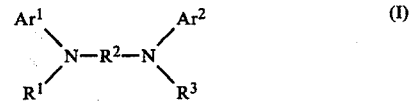

wherein each of $Ar^1$ and $Ar^2$ is an aromatic radical containing about 6-10 carbon atoms; each of $R^1$ and $R^3$ is hydrogen or a saturated lower aliphatic radical, or $R^1$ and $R^3$ together form a divalent saturated aliphatic radical containing 2-4 carbon atoms; and $R^2$ is a divalent saturated aliphatic or alicyclic radical containing 2-7 carbon atoms.

2. A composition according to claim 1 wherein the amine component comprises at least one tertiary monoamine, at least one secondary monoamine and said diamine, and wherein $R^2$ is an aliphatic radical containing 2-4 carbon atoms.

3. A composition according to claim 2 wherein the source of copper and bromide ions is a solution of cuprous oxide in aqueous hydrogen bromide.

4. A composition according to claim 3 wherein the molar ratio of bromide ions to copper ions is at least about 3.5:1, the molar ratio of tertiary monoamine is from about 10:1 to about 100:1 and the molar ratio of diamine to copper is from about 0.4:1 to about 3:1.

5. The composition according to claim 4 wherein the tertiary monoamine is dimethyl-n-butylamine and the secondary monoamine is di-n-butylamine.

6. A composition according to claim 5 wherein the diamine is N-N'-diphenylethylenediamine, N,N'-diphenyl-N,N'-dimethylethylenediamine or N,N'-diphenylpiperazine.

7. A composition according to claim 6 wherein the diamine is N,N'-diphenylethylenediamine.

8. A composition according to claim 6 wherein the diamine is N,N'-diphenyl-N,N'-dimethylethylenediamine.

9. A composition according to claim 6 wherein the diamine is N,N'-diphenylpiperazine.

* * * * *